United States Patent [19]
Delhaye et al.

[11] 3,802,090
[45] Apr. 9, 1974

[54] PROCESS AND INSTALLATION FOR DRYING FIBROUS CELLULOSE MATERIALS

[75] Inventors: Jean Delhaye, Isere; Paul Vuarchex; Roger Furlan, both of Rhone, all of France

[73] Assignee: Jeumont-Schneider, Paris, France

[22] Filed: July 20, 1972

[21] Appl. No.: 273,502

[30] Foreign Application Priority Data
July 22, 1971  France .......................... 71.26810

[52] U.S. Cl. .................... 34/9, 34/15, 34/92
[51] Int. Cl. ............................. F26b 7/00
[58] Field of Search .................... 34/5, 9, 15, 92

[56] References Cited
UNITED STATES PATENTS
2,718,709  9/1955  Ford .............................. 34/15 X
2,293,453  8/1942  Clark ................................ 34/15
2,573,966  11/1951  Hamlin ........................... 34/15 X Primary Examiner—William F. O'Dea
Assistant Examiner—William C. Anderson

[57] ABSTRACT

A process and an installation for drying cellulose materials. The invention consists in placing the materials in a vacuum-tight enclosure, bringing the materials in contact in vacuo with ethylene glycol diacetate injected into the enclosure after having been dried and heated initially to a temperature of from 60° to 70° C and which is raised gradually during drying to a steady end value of from 100° to 110°C, maintaining a vacuum equal to the ethylene glycol diacetate vapour pressure in the enclosure throughout drying, drying the ethylene gylcol diacetate from the enclosure by exhausters, and condensing and filtering the recovered ethylene gylcol diacetate for reinjection into the enclosure, the cycle just described being repeated until the cellulose materials are completely dry.

2 Claims, 1 Drawing Figure

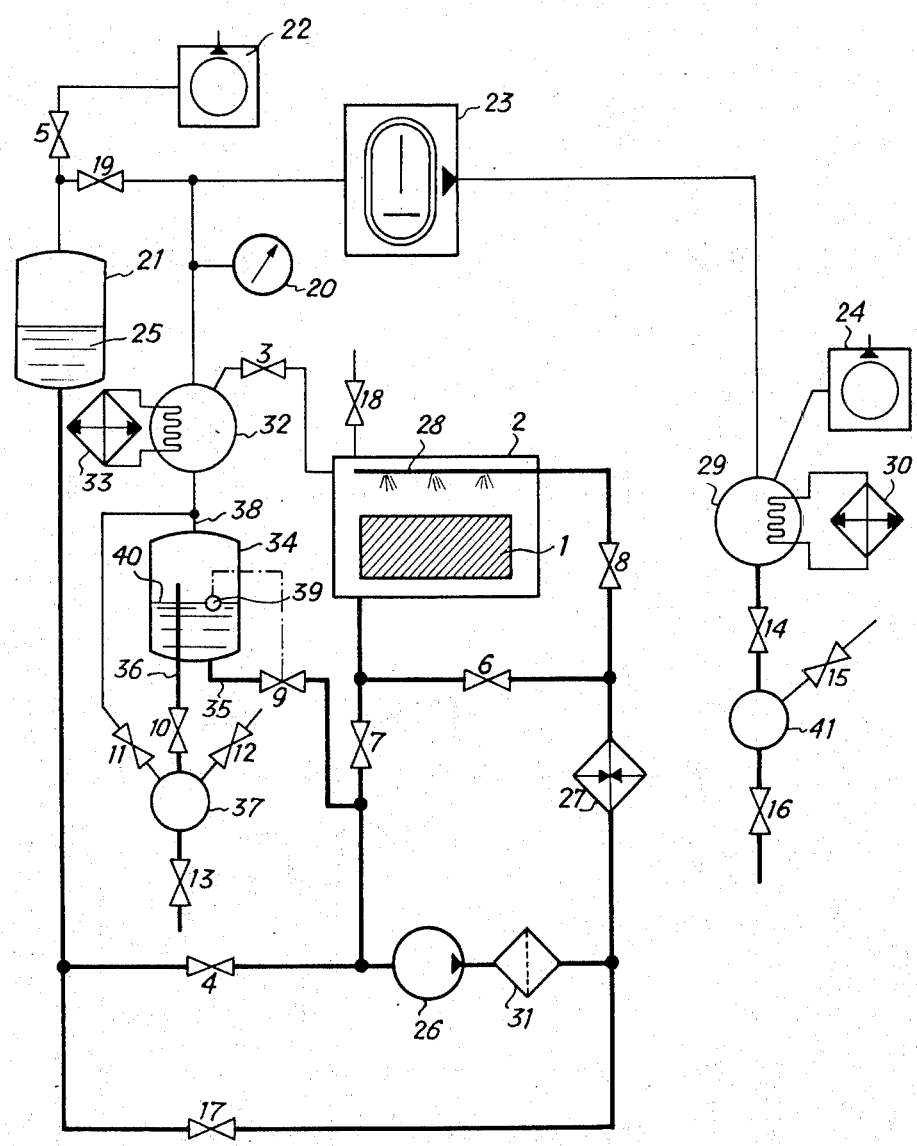

PROCESS AND INSTALLATION FOR DRYING FIBROUS CELLULOSE MATERIALS

This invention relates to a process and installation for drying fibrous cellulose materials used in the form of papers and boards in the insulation of electrical equipment, more particularly static transforming and converting equipment.

Of course, the presence of water in electrical insulation reduces the dielectric strength thereof very considerably and causes premature breakdown.

In some known processes for drying cellulose materials, the same are placed in contact in a vacuum oven with a previously dried and heated fluid when is highly water-absorbent and from which the water is removed subsequently by appropriate means such as a vacuum or distillation or selective absorption. Methods of this kind are used, e.g., to dry transformer windings, the drying fluid in this case usually being transformer oil which is also used to impregnate the windings.

Processes of this kind are difficult to use and have limited results, since, because of the great affinity of cellulose for water, the drying fluid must have a high solvent power relatively to water and since there is considerable capillary action in the cellulose insulants to be treated; when the heat exchange needed to dry the cellulose is provided by means of a liquid, the surface-tension forces between the water or its vapour and the insulant-impregnating heating liquid are a great nuisance which cannot readily be obviated. The drying fluid must therefore have a very reduced interfacial tension with water.

If the insulants are dense or thick, water extraction is always limited by the internal back pressures produced by these forces, whatever the vacuum applied to the drying chamber or enclosure and however long the treatment time may be.

Yet another disadvantage of conventional processes is dimensional changes in the cellulose insulation, i.e., swelling or reduction of the cellulose occurring after drying and possible re-gain of moisture. This is a very serious disadvantage for large transformers, in which dimensional stability of the windings is a very important factor.

This invention obviates all these disadvantages and is based on the novel use as drying fluid of ethylene glycol diacetate having the structural formula:

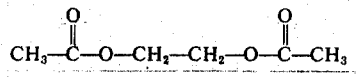

hereinafter abbreviated to EGD. In normal temperature and pressure conditions EGD is an industrially pure liquid distinguished from the mineral oil conventionally used in transformer drying in the following way:

| | Mineral oil | EGD |
|---|---|---|
| Density at 20°C in g/cm³ | 0.88 | 1.10 |
| Concentration in saturation water at 100°C in 10⁻⁴ of density | 7 | 2000 |
| Interfacial tension with water at 20°C in dynes/cm | 43 | 2 |
| Saturating vapour tension at 100°C in mm Hg | 3 | 30 |
| Flashpoint in °C | >145 | 124 |

EGD has the following advantages over mineral oil and other drying fluids:

High vapour tension, so that EGD can be used wholly or partly in its vapour phase. Heat is therefore transferred to the insulation much faster and more uniformly than with other methods because of release of the latent heat of condensation, which is much greater than the heat capacity of the liquid. Because of its volatility, EGD can be removed more readily than other materials from the insulant upon the completion of drying.

Its density of 1.1 is near the density of cellulose fibre (1.5). Consequently, while in contact with the insulants EGD provides more vigorous vehiculing of the fibres usually present on insulant surfaces than could be provided by a lower-density liquid. Surface fibres may impair transformer insulation if they subsequently become suspended in the mineral oil fill. The low surface tension also helps this cleaning effect.

Very reduced changes in size of the cellulose insulation after drying and possible take-up of moisture.

Very safe to use, thanks to very reduced toxicity and high flashpoint.

The invention relates first to a process for drying cellulose materials, the process comprising placing the materials in a vacuum-tight enclosure, bringing the materials in contact in vacuo with EGD, the same being injected into the enclosure after having been dried and heated initially to a temperature of from 60° to 70°C which is raised gradually during drying to a steady end value of from 100° to 110°C, maintaining a vacuum equal to the EGD vapour pressure in the enclosure throughout drying, drying the EGD vapour extracted from the enclosure by the exhausters, and condensing and filtering the recovered EGD for reinjection into the enclosure, the cycle just described being repeated until the cellulose materials are completely dry.

The invention relates second to an installation for drying cellulose materials, for use with the process described and comprising:

a. a vacuum-tight enclosure which contains the cellulose material for drying and which has a first line for the introduction of dry EGD in the liquid state into the enclosure from a vacuum supply tank connected in series with a heater, a second line at the bottom of the enclosure for the discharge of liquid EGD to the supply tank, and a third line to which the following items are connected in series, starting from the enclosure, to recover and dry the EGD and to remove residual gases from the enclosure:
  i. a first condensor associated with a separator and with a first water trap,
  ii. a first vacuum exhauster,
  iii. a second condensor associated with a second water trap,
  iv. a second vacuum exhauster to produce a preliminary vacuum, the first exhauster serving to boost the preliminary vacuum created by the second exhauster;

b. a pump associated with a filter in the liquid EGD line between the supply tank and the enclosure; and valves for isolating the various items mentioned and enabling the pump in series with its filter either to remove EGD from the enclosure to the tank through the second line or to inject EGD into the enclosure through the first or second line.

As a variant the EGD, instead of being used pure, can have an addition of an organic base, for instance, of the class of the amines such as melamine or dicyandiamine, in sufficient quantity to reduce the tendency which EGD may have to hydrolyse in the presence of water in some conditions.

The invention will be more clearly understood with reference to an embodiment used for drying insulated transformer windings and if reference is made to the single accompanying drawing which shows a diagram of the corresponding drying installation.

In the drawing, the lines of the vacuum and EGD recovery circuits are shown in thin line, the heavy lining corresponding to the liquid EGD lines and to the water discharge or removal lines. For the sake of clarity the associated protection and measuring circuitry and some control features not necessary for an understanding of the drying process are not shown.

First, an insulated winding 1 of a transformer is introduced into a vacuum-tight enclosure or chamber or the like 2. Initially, all valves 3 – 19 are closed except for valve 5, via which an exhauster 22 can continuously exhaust a supply reservoir or tank 21 containing EGD 25. Valve 19 remains closed throughout the drying operation unless exhauster 22 stops accidentally, in which event valve 5 must be closed to give direct communication between reservoir 21 and exhausters 23, 24. Valves 13, 16 are water removal valves and valves 12, 15, 18 are air inlet valves.

To start drying, valve 3 is opened and exhauster 24 is started so as to create a perliminary vacuum, whereafter the two-stage Roots exhauster 23 operates as soon as a vacuum below 2 mm Hg is indicated on pressure gauge 20. The exhausters 23, 24 exhaust air from chamber 2 until the pressure therein is approximately the same as in reservoir 21. The oxygen present in the initial air content of chamber 2 until the pressure therein is approximately the same as in reservoir 21. The oxygen present in the initial air content of chamber 2 would also have the effect, at the temperatures of 100° to 110°C used in the remainder of the operation, of being responsible for cumulative impairment of the EGD in consecutive drying operations and, to a smaller extent, of cumulative impairment of the cellulose insulants of winding 1.

This preliminary vacuum phase should not be too long; if it is, the water present in the insulants may freeze because of cooling by evaporation in the vacuum, and this freezing would impair subsequent drying. The valves 4, 6 are then opened and the pump 26 is operated to introduce some EGD from reservoir 21 into chamber 2, the EGD having been heated to from 60° to 70°C by heater 27; valves 4, 6 are then closed and valves 7, 8 are opened to supply sprays 28 which produce a mixture of mist and vapour whose vapour content is greater in proportion as the temperature of the EGD is incraased in the remaining phase of the operation. The spraying temperature remains at the fairly low temperatures specified to start with so as to limit the evolution of water vapour, since a high temperature at the start of the operation would exceed the capacity of the water condensor 29 and its associated cooler 30.

In the spraying phase only the exhauster 24 operates, since the exhauster 23 operates only below the critical value previously mentioned, such value or threshold being less than the EGD vapour pressure at its working temperature. A filter 31 in series with pump 26 retains the cellulose fibres which are bound to be present on the surface of the insulants of winding 1, so that the insulants are cleaned.

During this spraying stage the condensors 32, 29 disposed in the vacuum line on either side of exhauster 23 are in operation. Condensor 32, the cooler 33 of which cools to from 10° to 20°C, condenses the EGD vapour which issues in large amounts through the vacuum line from chamber 2. This cooling must remain moderate since an over-low temperature may reduce condensor selectivity. However, some of the water which should properly be retained by the condensor 29 is bound to condense in condensor 32, and so the same is followed by a separator 34 in the form of an elongated vertical cylinder in which the relatively dense EGD drops to the bottom while the less dense water stays on the top. Connected to the bottom of separator 34 is a line 35 through which the EGD condensed upstream of pump 26 is reinjected through valve 9. A second line 36 which extends into the top half of separator 34, i.e., above the boundary 40 between the liquid EGD and the water, serves to remove condensed water to a tray 37 through the open valve 10. The valve 11 is open to balance the pressures between top line 38 from the separator 34 and trap 37. So that water is not reinjected into the EGD circuit nor EGD removed through the top line 38, a float 39 having an apparent density somewhere between the density of EGD and water is used to control valve 9, the same opening only when the boundary 40 between the EGD and the water reaches a predetermined level. The valve 9 opens more in proportion as the latter level rises upon an inflow of an excess of condensate and vice versa.

Water is removed periodically from the trap 37 by the following sequence of operations which can be automated — valve 11 is closed, valve 10 is closed, valve 12 is opened to connect trap 37 to atmospheric pressure, and drain valve 13 is opened.

After the trap 37 has been drained, the sequence of operations just described is performed but in the converse order, the valve 10 reopening only once pressure equilibrium has been restored between the elements 34 and 37. In this spraying time the condensor 29 upstream of exhauster 24 serves, as already stated, to trap most of the extracted water; there may be a considerable amount thereof since a 20 ton load of insulants in hygrometric equilibrium with an atmosphere of 50 or 60 percent relative humidity contains approximately 1.2 m$^3$ of water. Condensor 29 is maintained at a temperature of from 1° to 3°C by a flowing liquid cooled by a cooler 30. At the end of spraying, when the rate of flow of trapped water becomes very small, condensor temperature drops to from −2° to −5°C, leading to an increase in the water vapour specific pumping capacity.

Periodic draining of the trap 41 by means of valves 14 – 16 is identical to the periodic draining of the hereinbefore described trap 37.

During spraying residual gases are removed by exhauster 24.

The temperature of the EGD is increased to from 100 to 110°C in proportion to the decrease of the water extraction rate; this rate is measured either directly, by measuring the condensed volume, or indirectly, by measuring the partial water vapour pressure in the vacuum circuit.

The temperature control can be linked with the rate of condensate flow. When the measurements just described show that water extraction has stopped, the valves 6, 8 are closed to stop spraying and the valves 7, 17 are opened so that the EGD in the chamber 2 goes to reservoir 21. Pump 26 is stopped and the valves 4, 6 – 11, 17 are closed. The combined effect of evaporation of the insulant-impregnating EGd and reduction of the temperature in the chamber 2 is to reduce the pressure, whereupon the exhauster 23 controlled by the pressure gauge 20 comes into operation. At the end of the vacuum phase the pressure in the chamber 2 drops to from 0.02 to 0.03 mm Hg, with substantially total extraction of the EGD. Valve 3 can then be closed, the exhausters stopped and the insulants impregnated by immersion in a dry deaerated dielectric liquid, as a rule mineral oil, which is introduced in vacuo into chamber 2 by way of a circuit (not shown). When the insulants are fully immersed, valve 18 is opened to connect chamber 2 to atmospheric pressure. After one or two days the oil can be drained off and the chamber 2 opened for removal of the insulated, dry and oil-impregnated winding 1.

Alternatively, the insulation can be devised to use the EGD in its pure vapour phase, in which event the sprays 28 are omitted and the EGD is evaporated in vacuo in chamber 2 either by contact with the heated walls thereof or by preheated EGD being suppled to the bottom of chamber 2.

The invention is of use more particularly for drying the windings of static transforming or converting facilities and for drying inductance windings.

We claim:

1. A process for drying cellulose materials, the process comprising placing the materials in a vacuum-tight enclosure, bringing the materials in contact in vacuo with ethylene glycol diacetate injected into the enclosure after said ethylene glycol acetate having been dried and heated initially to a temperature of from 60° to 70°C which raised gradually during drying to a steady end value of from 100° to 110°C, maintaining a vacuum equal to the ethylene glycol diacetate vapour pressure in the enclosure throughout drying, drying the ethylene glycol diacetate vapour extracted from the enclosure by means of exhausters, and condensing and filtering the recovered ethylene glycol diacetate for reinjection into the enclosure, the cycle just described being repeated until the cellulose materials are completely dry.

2. An installation for drying cellulose materials comprising:
   a. a vacuum-tight enclosure which contains the cellulose material for drying and which has a first line for the introduction of dry ethylene glycol diacetate in the liquid state into the enclosure from a vacuum supply tank connected in series with a heater, a second line at the bottom of the enclosure for the discharge of liquid ethylene glycol diacetate to the supply tank, and a third line to which the following items are connected in series, starting from the enclosure, to recover and dry the ethylene glycol diacetate and to remove residual gases from the enclosure:
      i. a first condenser associated with a separator and with a first water trap,
      ii. a first vacuum exhauster,
      iii. a second condensor associated with a second water trap,
      iv. a second vacuum exhauster to produce a preliminary vaccum, the first exhauster serving to boost the preliminary vacuum created by the second exhauster;
   b. a pump associated with a filter in the liquid ethylene glycol diacetate line between the supply tank and the enclosure; and
   c. valves for isolating the various items mentioned and enabling the pump in series with its filter to inject said ethylene glycol diacetate into the enclosure through the first line, before the drying of said diacetate, and through the second line, during the drying of said acetate, and to remove said ethylene glycol acetate from the enclosure to the tank after the acetate has been dried.

* * * * *

UNITED STATES PATENT OFFICE
CERTIFICATE OF CORRECTION

Patent No. 3,802,090      Dated April 9, 1974

Inventor(s) JEAN DELHAYE, PAUL VUARCHEX and ROGER FURLAN

It is certified that error appears in the above-identified patent and that said Letters Patent are hereby corrected as shown below:

IN THE ABSTRACT:

Lines 11 and 13, "gylcol" should read -- glycol - line 11, after "diacetate", there should be inser

-- vapour extracted --.

IN THE SPECIFICATION:

Column 5, line 36, "acetate" should read -- diacetate --.

Signed and sealed this 11th day of March 1975.

(SEAL)
Attest:

RUTH C. MASON
Attesting Officer

C. MARSHALL DANN
Commissioner of Patents
and Trademarks